A. P. BURRITT.
BATTERY CELL.
APPLICATION FILED JUNE 11, 1915.

1,154,372.

Patented Sept. 21, 1915.

Inventor
Augustin P. Burritt
by Seymour Earle
Atty

UNITED STATES PATENT OFFICE.

AUGUSTUS P. BURRITT, OF OZONE PARK, NEW YORK.

BATTERY-CELL.

1,154,372.  Specification of Letters Patent.  Patented Sept. 21, 1915.

Application filed June 11, 1915. Serial No. 33,509.

*To all whom it may concern:*

Be it known that I, AUGUSTUS P. BURRITT, a citizen of the United States, residing at Ozone Park, in the county of Kings and State of New York, have invented a new and useful Improvement in Battery-Cells; and I do hereby declare the following, when taken in connection with the accompanying drawings and the characters of reference marked thereon, to be a full, clear, and exact description of the same, and which said drawings constitute part of this application, and represent, in—

Figure 1:
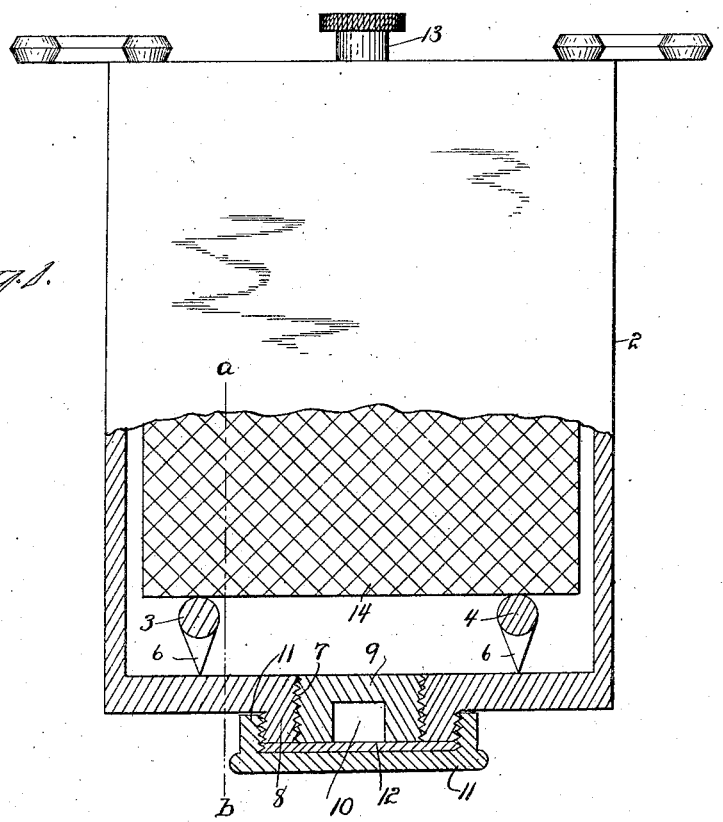
Figure 2:
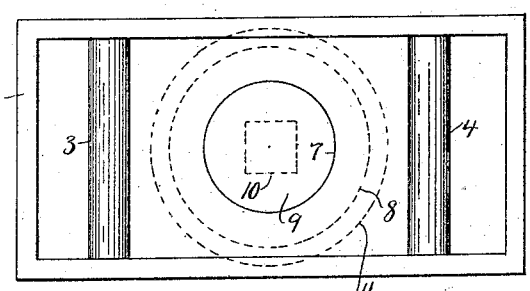
Figure 5:
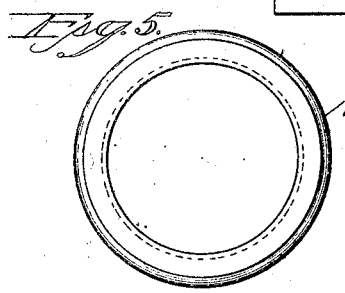
Figure 3:
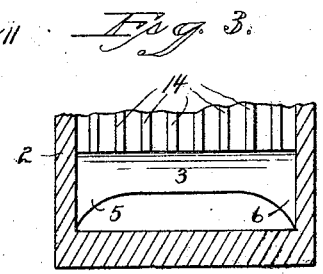
Figure 4:
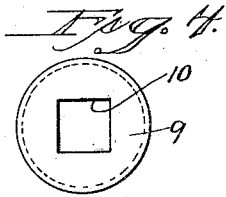

Figure 1 a side view partly in section of a battery cell constructed in accordance with my invention. Fig. 2 a plan view with the top and grids or plates removed. Fig. 3 a sectional view on the line $a$—$b$ of Fig. 1. Fig. 4 an underside view of the bottom plug. Fig. 5 an inside view of the closing cap.

This invention relates to an improvement in battery cells particularly batteries of the type employing plates suspended in the cells and commonly known as storage batteries. In the use of these batteries a sediment collects in the bottom of the cell which when in sufficient amount will short circuit the various plates. These batteries must, therefore, be frequently cleaned and they have been constructed with openings at the top and bottom through which water may be passed so as to flush the cell; but in the usual construction of cells of this type pockets are formed in which the sediment accumulates and from which it is extremely difficult to remove.

The object of this invention is to provide a cell with arches or supports for the plate which will not interfere with the perfect flushing of the cell.

A further object of the invention is to provide means for firmly closing the flushing outlet at the bottom of the cell and making a double seal; and the invention consists in the construction hereinafter described and particularly recited in the claims.

In carrying out my invention, I employ a cell 2 of the desired shape, usually rectangular in cross section, and near the bottom I provide transverse bars or arches 3 and 4, the under faces of the ends 5 and 6 being beveled and curved downward toward the bottom of the cell so as to provide a firm support, these arches being formed integral with the cell. In the bottom of the cell is a central threaded opening 7, and around this opening is a neck 8 externally threaded. Inserted into the bottom of the threaded opening 7 is a threaded plug 9 formed with a central angular recess 10 to receive a wrench by which the plug may be screwed into the opening 7. Over the neck 8 I secure a cap 11 which contains a rubber disk 12 which comes to a bearing on the outer end of the neck 8 and end of the plug 9 so as to form a perfect double water-tight closure for the bottom of the cell. At the top of the cell is an inlet 13 through which liquid may be passed into the cell. Whenever it is desired to clean the cell it is only necessary to remove the cap 11 and plug 9 allowing the liquid contents of the cell to be removed. A stream of water may then be turned into the inlet 13 and the entire inner surface of the cell thoroughly washed, and on account of the character of the supporting bridges 3 and 4 no pockets are formed which prevent the perfect circulation of water around the bottom of the cell and so that all particles of sediment can be removed. It will be understood that the usual battery grids or plates 14 rest upon the upper edges of the arches 3 and 4, and as the upper edges of these arches are rounded the possibility of short-circuiting between the plates is reduced to the minimum. In washing the cells it is unnecessary to disconnect the lead-connections between the batteries or remove the plates from the cells.

I claim:—

1. A battery cell provided near its bottom with integral transverse arches upon which battery plates may rest.

2. A battery cell formed near its bottom with integral transverse arches the main portions of which stand above the bottom of the cell, said cell provided at its upper end with an inlet opening and in its bottom with a central threaded opening, an externally threaded collar around said opening, a threaded plug adapted to be entered into said central opening, a threaded closure cap applied to said neck and a sealing disk within said cap.

AUGUSTUS P. BURRITT.